C. WATSON.
ROTARY-HARROWS.
No. 194,749. Patented Aug. 28, 1877.
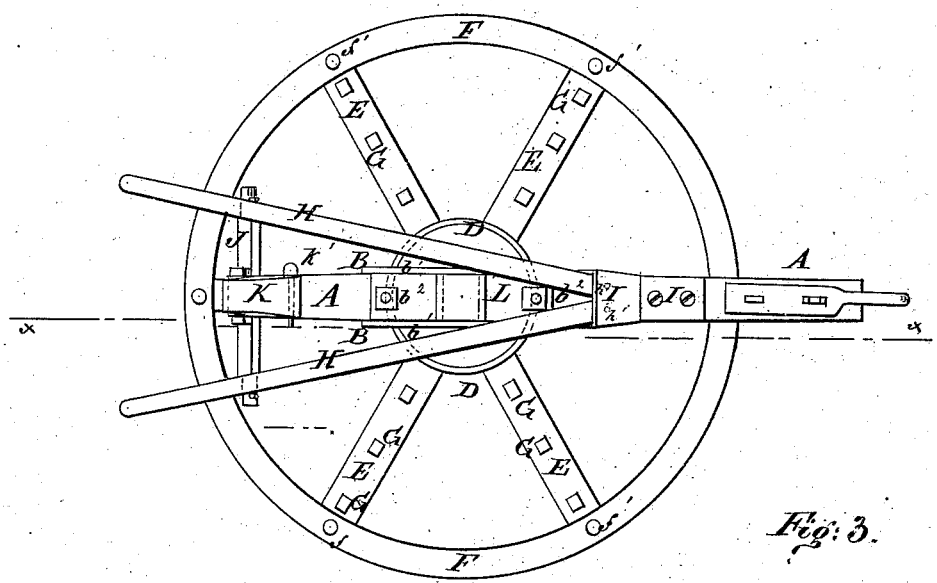
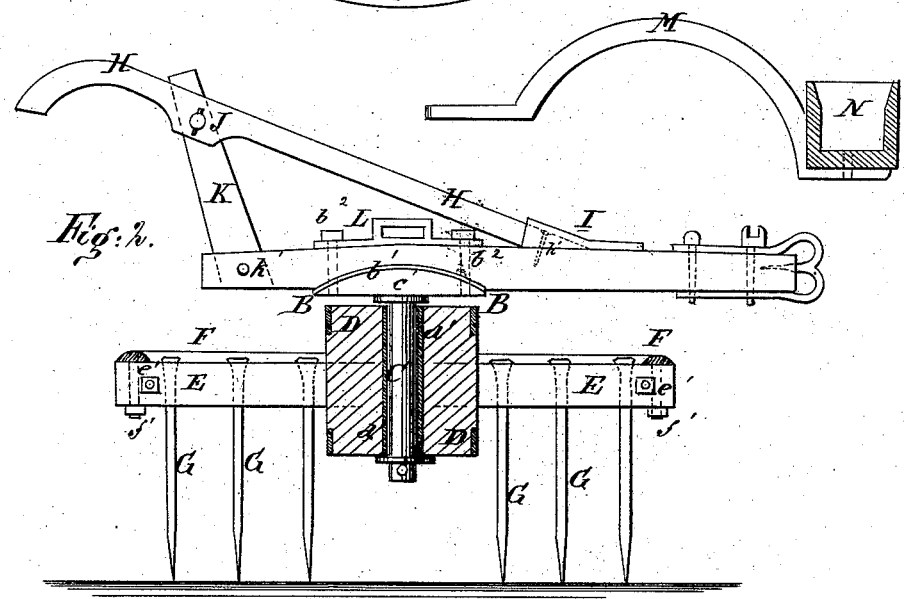
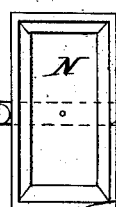
WITNESSES:
Chas. Nida
J. H. Scarborough
INVENTOR:
C. Watson
BY Munn & Co
ATTORNEYS.

UNITED STATES PATENT OFFICE.

CORNELIUS WATSON, OF YANCEYVILLE, NORTH CAROLINA, ASSIGNOR TO HIMSELF AND JAMES G. GUNN, OF SAME PLACE.

IMPROVEMENT IN ROTARY HARROWS.

Specification forming part of Letters Patent No. 194,749, dated August 28, 1877; application filed June 25, 1877.

*To all whom it may concern:*

Be it known that I, CORNELIUS WATSON, of Yanceyville, in the county of Caswell and State of North Carolina, have invented a new and useful Improvement in Rotary Harrow, of which the following is a specification:

Figure 1 is a top view of the rotary harrow. Fig. 2 is a section of the same taken through the line $x$ $x$, Fig. 1. Fig. 3 is a detail side view of the weight-box arm, the weight-box being shown in section. Fig. 4 is a detail top view of the same.

Similar letters of reference indicate corresponding parts.

The object of this invention is to furnish an improved rotary harrow which shall be simple in construction, strong and durable, effective in operation, and inexpensive in manufacture, being so constructed that it need not cost any more than an ordinary harrow.

The invention will first be described in connection with the drawing, and then pointed out in the claim.

A represents a beam similar to a plow-beam, to the forward end of which the draft is applied.

To the lower side of the beam A, a little in the rear of its center, is secured a plate, B, to the center of which is attached the axle C, which has a collar, $c'$, formed upon it at the lower side of the plate B, to prevent the upper end of the hub D from rubbing against the said plate B.

The plate B has flanges $b^1$ formed upon it, which overlap the sides of the beam A, to keep the said beam firmly in place. The plate B $b^1$, and the axle and collar C $c'$, may be cast solid in one piece; and the said plate is secured to the beam A by two bolts, $b^2$, that pass up through the said beam A. The axle C passes down through a box, $d'$, inserted in the hub D, to prevent wear, and the said hub is secured in place upon it by a washer and pin, as shown in Fig. 2.

To the hub D are attached six, more or less, radial arms, E, the outer parts of which are held in position by a rim, F, which is secured to them by bolts $f'$ passing through it and through the said arms E. The ends of the arms E may project beyond the rim F, and may have teeth attached to them upon the outside of the said rim F.

The arms E may be guarded against splitting by bolts $e'$, passed transversely through their ends.

G are the teeth, which are made with small heads and a swell at their upper ends, so as to require no nuts to keep them in place.

H are the handles, the forward ends of which are inserted in a keeper, I, attached to the beam A by screws or bolts. The forward ends of the handles H are further secured in place by pins $h'$, which pass through them and into the beam A, and which are covered by the keeper I.

The handles H are connected by a round, J, the middle part of which is secured to the upper end of the standard K. The lower end of the standard K, or a tenon formed upon said lower end, is inserted in a mortise formed in the rear end of the beam A, and is secured in place, detachably, by a pin, $k'$, so that by withdrawing the said pin, and detaching the keeper I, the handles H and their standard K may be detached when desired.

L is a plate, placed upon the upper side of the beam A and secured in place by the bolts $b^2$ that secure the axle-plate B to said beam. Upon the upper side of the middle part of the plate L is formed a socket to receive the end of the arm M, which is secured in said socket by a pin passed through its end.

The arm M is curved or arched, and to its outer end is attached a box, N, to receive a small weight to sink the teeth upon one side a little deeper into the ground, so that the harrow will necessarily rotate. The same effect may be produced by bearing heavier upon one handle than upon the other.

Having thus described my invention, I claim as new and desire to secure by Letters Patent—

The combination of a draft-frame having handles, a vertical axle having collar as well as flange, and a rotary frame provided with harrow-teeth, as and for the purpose specified.

CORNELIUS WATSON.

Witnesses:
JAMES F. TERRY,
N. P. OLIVER.